UNITED STATES PATENT OFFICE.

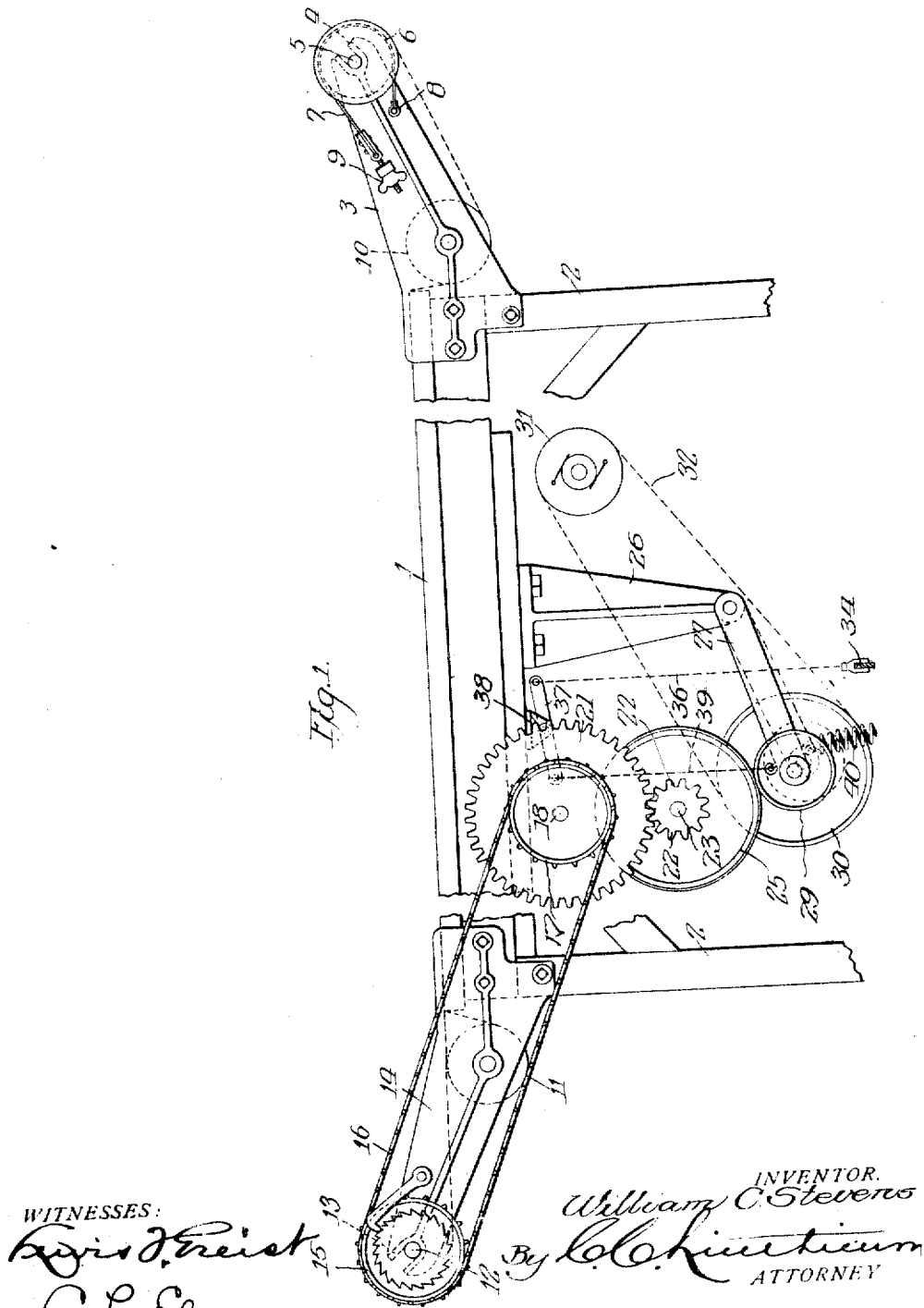

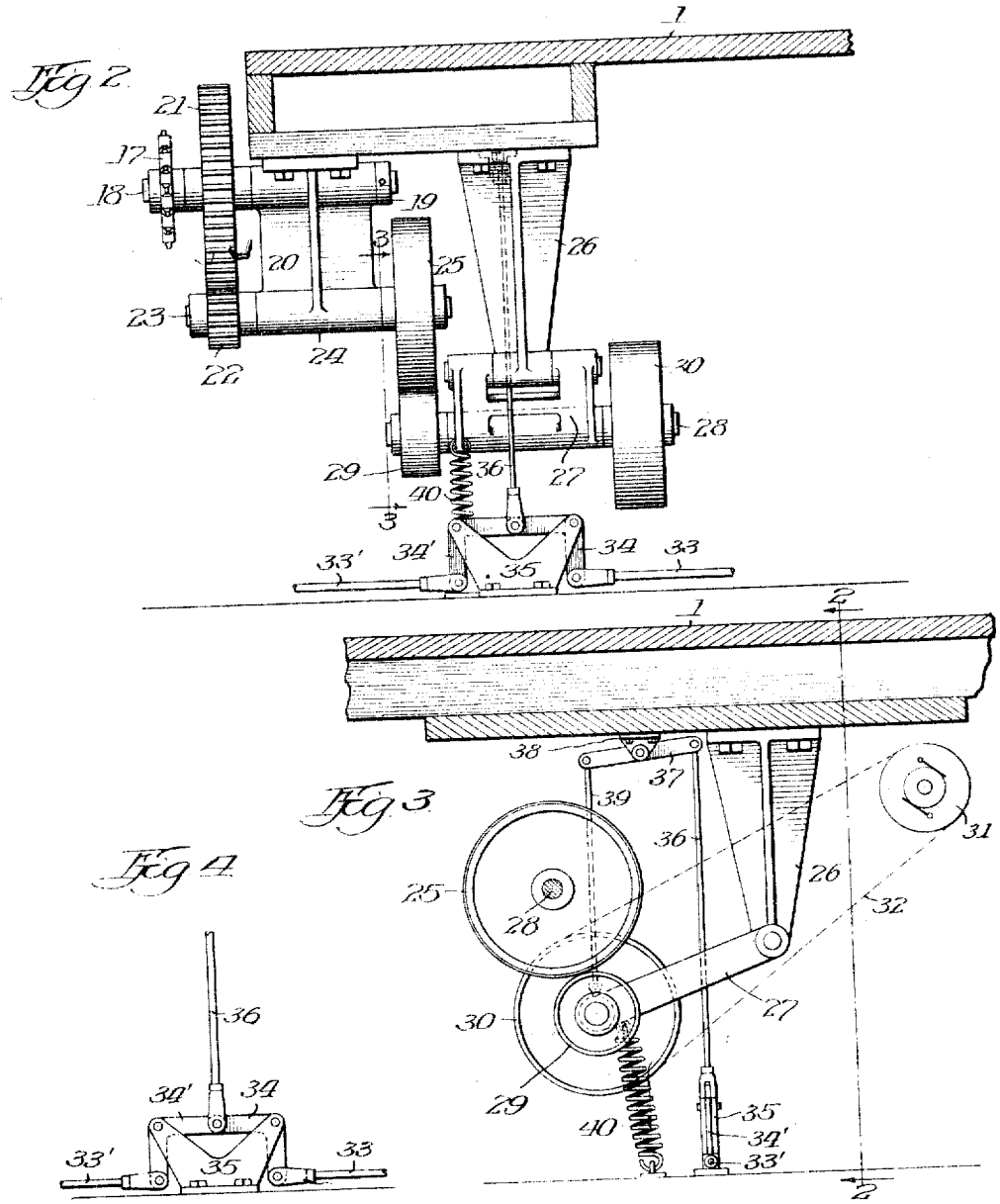

WILLIAM C. STEVENS, OF AKRON, OHIO, ASSIGNOR TO THE FIRESTONE TIRE & RUBBER COMPANY, OF AKRON, OHIO, A CORPORATION OF OHIO.

BIAS-FABRIC-ASSEMBLING TABLE.

1,263,292.  Specification of Letters Patent.  Patented Apr. 16, 1918.

Application filed May 20, 1916. Serial No. 98,716.

*To all whom it may concern:*

Be it known that I, WILLIAM C. STEVENS, a citizen of the United States, residing at Akron, in the county of Summit and State of Ohio, have invented certain new and useful Improvements in Bias-Fabric-Assembling Tables, of which the following is a specification.

This invention relates to that stage in the manufacture of automobile tires during which the previously cut strips of bias fabric carrying a rubber coating are assembled into long strips to be used on the tire machines. For a better understanding of this invention reference is made to my prior Patents Nos. 1,181,937, May 2, 1916, and 1,185,447, May 30, 1916, which disclose the method of assembling the strips of bias fabric in rolls in which condition it is first received on the apparatus herein shown.

The following short description of the method of manufacture will aid in an undestanding of my invention.

Fabric which is used in the manufacture of automobile tires is impregnated with rubber compound which is calendered into the fabric from both sides and then given a finish coat or a "skim coat" of a thin layer of rubber stock upon one side. This treatment serves to make the fabric sticky and hard to handle, and for this purpose it is wound up between a fabric liner which prevents contact of the rubber coated surfaces. The fabric is then taken to a bias cutter which divides it into a series of strips at an angle of 45°. At the bias cutter the fabric is now in the form of rubber coated strips is formed in rolls with a second continuous strip of liner, as described more particularly in my patents mentioned above.

It is now necessary to form the bias strips in a continuous length ready for application to the tire machines, and for this purpose the rolls of liner fabric and bias strips are transferred to the assembling table shown herein.

The object of this invention is to provide a new and useful apparatus for unwinding the rolls of material received from the bias cutter, exposing the rubber coated strips and enabling the workman to quickly and easily remove them to a board or table where they are joined end to end to make the continuous strips which are used in the tire making machines.

The apparatus forming the subject matter of this application is shown in the accompanying drawings in which like numerals refer to like parts, and, in which:

Figure 1 is a side elevation of my improved table parts being broken away to enable the view to be placed on the sheet.

Fig. 2 is a cross section through the table showing the driving mechanism.

Fig. 3 is a fragmentary view showing the means for throwing on and off the power for unwinding the liner.

Fig. 4 is a detail.

The apparatus comprises a table 1 supported on legs 2. The table is of considerable length in order that a sufficient number of bias strips may be exposed on the surface so that one or two workmen at opposite sides thereof may work to advantage.

At one end of the table are secured a pair of brackets 3 (one only being shown in the drawings) which extend upwardly at a slight inclination, the outer end of each bracket being formed with a bearing 4 in which is seated the reduced end 5 of the core carrying the roll of fabric and bias strips. To the end of the core is secured a drum 6 around which is passed a brake band 7 one end of which is secured to the arms 3 as at 8, the other end being adjustably secured to the same arm by a nut 9. The purpose of the brake band is to prevent the roll of fabric and bias strips from over running.

From the roll the fabric, carrying on its upper surface a layer of the bias strips of rubber coated fabric, is passed under an idler roll 10 mounted in the arms 3 and then up over the edge of the table 1. While the fabric liner is resting on the top of the table, a workman or workmen on each side of the table remove the bias strips and unite them end to end to form the continuous strips for the tire machine.

The liner fabric, after the strips of rubber coated tire fabric have been removed passes off the end of the table, over the top of a guide roll 11, and is wound upon a roll, the core 12 of which is received in bearings 13 formed in the ends of inclined arms 14 screwed to the end of the table.

The mechanism for driving the wind up roll comprises a sprocket wheel 15 secured to the core over which runs a sprocket chain 16. The sprocket chain is driven by a second sprocket wheel 17, which is secured to a shaft 18 rotating in bearing 19 formed in a hanger 20 secured to the under side of the table. Between sprocket 17 and the hanger 20 there is secured on the shaft 18 a large gear 21 which meshes with a small pinion 22 secured to a shaft 23 rotatably in a second bearing 24 at the end of the hanger. The shaft 23 is extended beyond the inner side of the hanger and carries at that end a smooth friction wheel 25. Secured to the under side of the table at one side of the gearing just described is a second hanger 26 in the lower end of which is mounted a rocking arm 27, which is extended forward to a point in line with the lower portion of the wheel 25. In the lower end of the arm 27 is mounted a shaft 28 which extends on both sides of the arm carrying a driving roll 29 at one side and a pulley 30 at the other side of the arm 27. Driving impulse is given to the pulley 30 from a motor 31 carried at any suitable point in the framework, shown diagrammatically in Fig. 1, by a belt connection 32.

The arm 27 is adapted to be rocked to bring the roller 29 into driving contact with the surface of the friction wheel 25 whenever it is desired to unwind more of the fabric, this occurring when the operators have removed all of the exposed bias strips. This movement is controlled by the operator, and the means for operating will now be described.

A treadle (not shown) is arranged at any convenient point for the operator and to it is connected a rod 33 pivoted to a bell crank 34 mounted in a bracket 35 secured to the floor. An upright rod 36 extends from the upper end of the crank 34 and is connected to a walking beam 37 pivoted to a bracket 38 on the under side of the table at a point almost directly above the end of the arm 27. From the opposite end of the walking beam depends a rod 39 the lower end of which is pivotally connected to the free end of the arm 27. It will be seen that a movement outward of the rod 33 will cause the roller 29 to be brought in contact with the pulley 25 whereby the motor is caused to drive the wind-up pulley for the liner fabric, as long as the treadle is operated. A spring 40 serves to positively move the roller 29 from the wheel 25 when the treadle is released. If desired, a duplicate rod 33' and a duplicate crank shaft 34' may be provided for the opposite side of the table as shown in Fig. 4, whereby either of two workmen may control the unrolling of the fabric.

It is obvious that various changes and additions may be made to the form of the invention shown without departing from the spirit thereof or sacrificing any of its benefits.

Claim:

A bias fabric assembling table comprising an intermediate unobstructed operating surface, a bracket at one end of said surface for the rolled up liner and bias strips, a second bracket at the opposite end of said surface, a wind up roll on said second bracket, driving mechanism for said wind-up roll, a separable connection in said driving mechanism, means normally tending to hold said connection separate and means for placing said connection in operative relation.

WILLIAM C. STEVENS.

Witness:
A. L. ELY.